United States Patent
Kim et al.

(10) Patent No.: US 9,883,418 B2
(45) Date of Patent: Jan. 30, 2018

(54) WIRELESS NETWORK LOAD AND THROUGHPUT ESTIMATION

(71) Applicant: Apple Inc., Cupertino, CA (US)

(72) Inventors: Yuchul Kim, Santa Clara, CA (US); Joonsuk Kim, Saratoga, CA (US)

(73) Assignee: Apple Inc., Cupertino, CA (US)

(*) Notice: Subject to any disclaimer, the term of this patent is extended or adjusted under 35 U.S.C. 154(b) by 249 days.

(21) Appl. No.: 14/747,129

(22) Filed: Jun. 23, 2015

(65) Prior Publication Data

US 2016/0007226 A1  Jan. 7, 2016

Related U.S. Application Data

(60) Provisional application No. 62/020,172, filed on Jul. 2, 2014.

(51) Int. Cl.
| | |
|---|---|
| *H04W 4/00* | (2009.01) |
| *H04W 28/02* | (2009.01) |
| *H04W 48/18* | (2009.01) |
| *H04L 12/26* | (2006.01) |

(52) U.S. Cl.
CPC ..... *H04W 28/0236* (2013.01); *H04L 43/0888* (2013.01); *H04L 43/0894* (2013.01); *H04W 28/0231* (2013.01); *H04W 48/18* (2013.01)

(58) Field of Classification Search
USPC .......... 370/252, 328, 329, 331, 332
See application file for complete search history.

(56) References Cited

U.S. PATENT DOCUMENTS

| | | |
|---|---|---|
| 7,020,439 B2 | 3/2006 | Sinivaara et al. |
| 8,023,426 B2 | 9/2011 | Liu et al. |
| 2006/0187873 A1* | 8/2006 | Friday ............. H04W 48/20 370/328 |

(Continued)

FOREIGN PATENT DOCUMENTS

| | | |
|---|---|---|
| EP | 2768256 A1 | 8/2014 |
| WO | 2014177208 | 11/2014 |

OTHER PUBLICATIONS

Extended Search Report, European Application No. 15173757.4, dated Nov. 10, 2015, 15 pages.

(Continued)

*Primary Examiner* — Kwang B Yao
*Assistant Examiner* — Nguyen Ngo
(74) *Attorney, Agent, or Firm* — Meyertons Hood Kivlin Kowert & Goetzel, P.C.; Jeffrey C. Hood; Joel L. Stevens (57) ABSTRACT

This disclosure relates to determining load and estimating throughput of wireless networks by a wireless device. According to some embodiments, the numbers of active downlink and uplink nodes in a wireless network may be determined. Channel utilization of the wireless network may also be determined. An uplink data rate and a downlink data rate of the wireless device in the wireless network may be estimated. Based on the numbers of active downlink and uplink nodes, channel utilization, and the uplink data rate and a downlink data rate of the wireless device, the maximum possible uplink throughput and downlink throughput of the wireless device in the wireless network may be estimated. Such throughput estimates may be used to select a wireless network to join from among multiple available wireless networks.

20 Claims, 5 Drawing Sheets

(56) References Cited

U.S. PATENT DOCUMENTS

| | | |
|---|---|---|
| 2006/0223442 A1 | 10/2006 | Stephens |
| 2008/0320108 A1 | 12/2008 | Murty et al. |
| 2011/0136478 A1* | 6/2011 | Trigui ................... H04W 24/02 |
| | | 455/418 |
| 2012/0014251 A1 | 1/2012 | Arnott et al. |
| 2012/0307701 A1 | 12/2012 | Moe et al. |
| 2013/0176844 A1* | 7/2013 | Xia ....................... H04W 48/16 |
| | | 370/221 |
| 2013/0242943 A1* | 9/2013 | Zhou .................... H04W 24/02 |
| | | 370/331 |
| 2014/0126388 A1* | 5/2014 | Shin ..................... H04W 48/20 |
| | | 370/252 |
| 2014/0187243 A1 | 7/2014 | Rune et al. |
| 2014/0192642 A1 | 7/2014 | Medapalli |
| 2014/0211648 A1* | 7/2014 | Rahmati ............... H04W 48/12 |
| | | 370/252 |
| 2014/0328193 A1* | 11/2014 | Horn ..................... H04W 24/00 |
| | | 370/252 |
| 2014/0362776 A1 | 12/2014 | Tian et al. |
| 2015/0031367 A1* | 1/2015 | Singh .................... H04W 36/08 |
| | | 455/437 |
| 2015/0071304 A1* | 3/2015 | Li ....................... H04W 74/085 |
| | | 370/465 |
| 2015/0078351 A1 | 3/2015 | An et al. |
| 2015/0124605 A1 | 5/2015 | Gholmieh et al. |
| 2015/0131435 A1* | 5/2015 | Kasslin ................. H04W 84/12 |
| | | 370/230 |
| 2015/0131483 A1 | 5/2015 | Colban et al. |
| 2015/0230158 A1* | 8/2015 | Kim ...................... H04W 48/14 |
| | | 370/328 |
| 2015/0350018 A1* | 12/2015 | Hui ........................ H04L 47/11 |
| | | 370/254 |
| 2015/0365952 A1 | 12/2015 | Wang et al. |
| 2016/0278007 A1* | 9/2016 | Gokhale ............... H04W 48/20 |

OTHER PUBLICATIONS

Intel Corporation, "WLAN/3GPP access network selection based on maximum achievable rate metric", Discussion and Decision, 3rd Generation Partnership Project Meeting #81bis, Apr. 15-19, 2013, 8 pages, Chicago, USA.

Gerasimenko et al., "Characterizing Performance of Load-Aware Network Selection in Multi-Radio (WiFi/LTE) Heterogeneous Networks", Globecom 2013 Workshop, Dec. 9-13, 2013, 6 pages.

Qualcomm Incorporated, "RAN assisted Throughput estimation in Idle mode for WLAN-RAN interworking", Discussion and Approval, Feb. 10-14, 2014, 3 pages, Prague, Czech Republic.

Han et al., "Nonintrusive Estimation of Expected Throughput for IEEE 802.11 Devices", The 10th Annual IEEE CCNC—Network Games, Jan. 10-13, 2014, 6 pages, Seoul, Korea.

* cited by examiner

| 502 | 504 | 506 | 508 | 510 |
|---|---|---|---|---|
| Element ID | Length | Station Count | Channel Utilization | Available Admission Capacity |
| 1 | 1 | 2 | 1 | 2 |
| Octets | | | | |

FIG. 5

| 602 | 604 | 606 | 608 | 610 | 612 |
|---|---|---|---|---|---|
| Element ID | Length | # of Active DL STAs | # of Active UL STAs | Channel Utilization | Available Admission Capacity |
| 1 | 1 | 1 | 1 | 1 | 2 |
| Octets | | | | | |

WIRELESS NETWORK LOAD AND THROUGHPUT ESTIMATION

PRIORITY INFORMATION

This application claims priority to U.S. provisional patent application Ser. No. 62/020,172, entitled "Wireless Network Load and Throughput Estimation," filed Jul. 2, 2014, which is hereby incorporated by reference in its entirety as though fully and completely set forth herein.

FIELD

The present disclosure relates to wireless communication, including techniques for estimating load and throughput in wireless networks.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Wireless communication technologies tend to naturally lend themselves to use under mobile conditions. As such, wireless communication systems may sometimes have higher numbers of wireless devices present, and sometimes have lower numbers of wireless devices present. At least some wireless communication technologies may exhibit variable performance depending (among various other possible reasons) on the density of devices in wireless communication systems configured according to those wireless communication technologies. For example, a wireless network might have limited resources, such that a device in that network may be able to obtain more throughput with a smaller density of devices than with a larger density of devices in the network.

SUMMARY

This document describes, inter alia, methods for determining load and estimating available throughput of a wireless network, and describes wireless devices configured to implement the described methods.

According to the techniques described herein, a wireless device may determine the number of nodes in a wireless network which are currently (or have recently been) actively engaged in uplink communication, as well as the number of nodes in the wireless network which are currently (or have recently been) actively engaged in downlink communication.

As one possibility, such information may be signaled to the wireless device by an access point device providing the wireless network. For example, the information can be included in beacon broadcasts. As another possibility, the wireless device may estimate this information by monitoring the wireless medium.

Such information may be used, in combination with information regarding how fully utilized the wireless channel on which the wireless network operates is and an estimation of the data rate which the wireless device would be able to use in the wireless network, to estimate either or both of the uplink throughput and the downlink throughput which the wireless device would be able to obtain in the wireless network.

Such techniques may be used by a wireless device with respect to multiple networks, for example if the wireless device is within communicative range of multiple wireless networks and is determining which of the available wireless networks to join or associate with. For example, a wireless device may select a wireless network on which the estimated uplink throughput, downlink throughput, or both uplink and downlink throughput is highest among the available wireless networks, and join the selected network. In this way, the wireless device may be able to select the best available wireless network to join from a throughput perspective before actually associating with the wireless network.

The techniques described herein may be implemented in and/or used with a number of different types of devices, including but not limited to access point devices, cellular phones, portable media players, portable gaming devices, tablet computers, wearable computing devices, remote controls, wireless speakers, set top box devices, television systems, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Station (STA)—any of various types of computer systems devices which are mobile or portable and which performs wireless communications. Examples of STAs include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station or Access Point (AP)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases be referred to as) a "PHY rate". The combination of physical layer characteristics which result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 1:
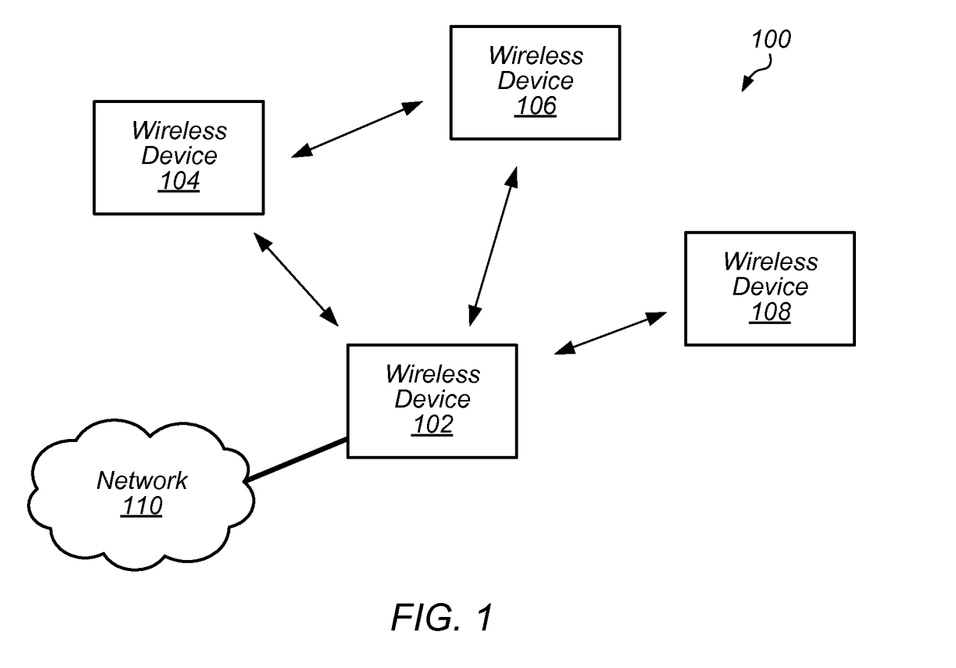
FIGS. 1-2 illustrate exemplary (and simplified) wireless communication systems.
Figure 2:
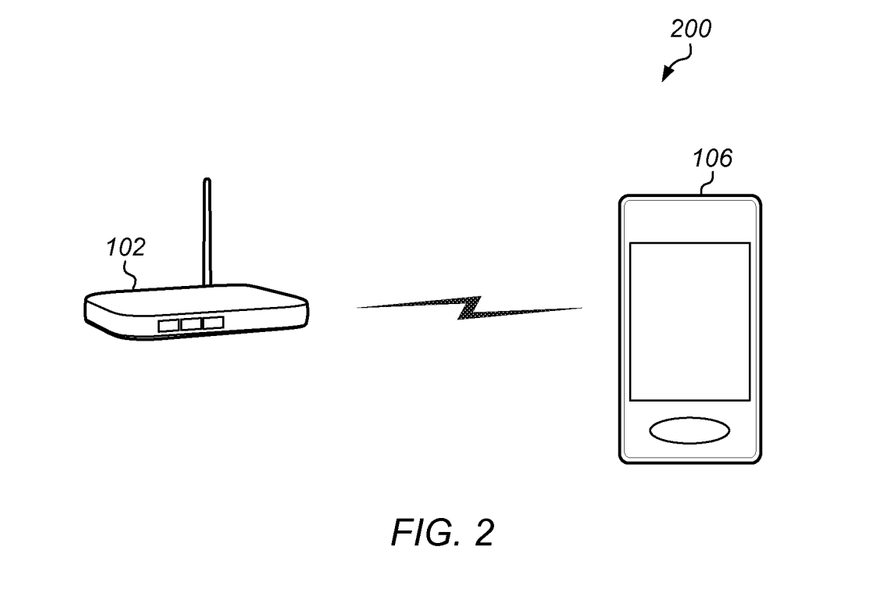

FIGS. 1-2—Communication System

FIG. 1 illustrates an exemplary (and simplified) wireless communication system 100 in which aspects of the present disclosure may be implemented, according to some embodiments. It is noted that the system 100 of FIG. 1 is only one example of a possible system, and embodiments may be implemented in any of various systems, as desired. For example, note that although the exemplary wireless communication system 100 illustrated in FIG. 1 is shown as including four wireless devices, aspects of the disclosure may be implemented in wireless communication systems having greater or fewer numbers (i.e., any arbitrary number) of wireless devices.

As shown, the exemplary wireless communication system 100 includes multiple wireless devices 102-108, which can communicate over at least one transmission medium. Some or all of the wireless devices may be substantially mobile devices ("stations" or "STAs"). Alternatively, or in addition, some or all of the wireless devices may be substantially stationary.

The wireless devices 102-108 may communicate over the wireless transmission medium in such a manner as to form a wireless network. The wireless network may be an IEEE 802.11 'infrastructure mode' network provided by a dedicated access point (e.g., wireless device 102); alternatively, the wireless network may be an 'ad-hoc' or peer-to-peer based network. Note that it may be possible that the wireless network may include one or more 'hidden nodes'; for example, as shown, wireless device 108 may be within communication range of wireless device 102, but may not be able to detect (and/or be detected by) wireless devices 104 and 106. Wireless device 108 may, however, be able to indirectly detect wireless devices 104 and 106, e.g., via wireless device 102. The wireless devices 102-108 may be configured to perform IEEE 802.11 (Wi-Fi) wireless communication and/or other forms of wireless communication according to aspects of the present disclosure.

One or more of the wireless devices may be equipped to communicate with one or more external networks. For example, as shown, wireless device 102 may be communicatively coupled to network 110. The external network(s) may be any of a variety of types of networks, such as a cellular service provider's core network, the Internet, or an organization's intranet, among various possibilities.

Note that in some instances, the wireless devices may be capable of communicating prior to associating to form a wireless network. Such 'pre-association' communication may include exchange of network, device and/or service discovery related information by way of beacons, probe requests and responses, generic advertisement service queries and responses, etc., and/or exchange of information for associating together (e.g., for a STA to join the wireless network of an AP, for two STAs to form a peer-to-peer association, etc.). Such pre-association information advertisement and/or exchange may help devices to determine whether to join a network prior to spending time and consuming power to associate with that network.

Note that one or more of the wireless devices 102-108 may be capable of communicating using multiple wireless communication standards. For example, one or more of the wireless devices 102-108 may be configured to communicate using at least one wireless networking protocol (e.g., Wi-Fi) and/or peer-to-peer wireless communication protocol (e.g., BT, Wi-Fi peer-to-peer, etc.) and at least one cellular communication protocol (e.g., GSM, UMTS, LTE, LTE-Advanced (LTE-A), HSPA, 3GPP2 CDMA2000 (e.g., 1×RTT, 1×EV-DO, HRPD, eHRPD), etc.). Any or all of wireless devices 102-108 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 4:
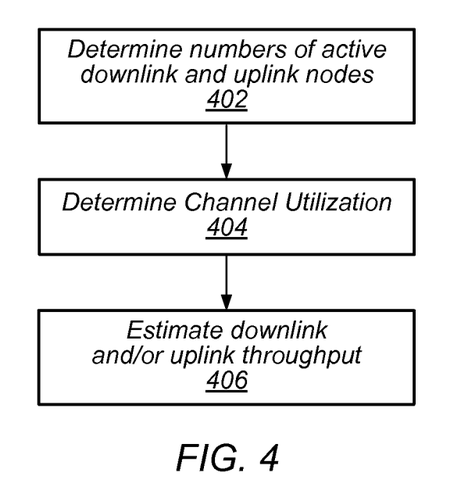
FIG. 4 is a flowchart diagram illustrating aspects of an exemplary method for estimating load and throughput of a wireless network.

Any or all of the wireless devices 102-108 and/or the network 110 illustrated in FIG. 1 may be configured to implement or support implementation of part or all of the methods described herein, including, inter alia, the method of FIG. 4.

FIG. 2 illustrates an exemplary wireless communication system 200 in which possible example aspects of the system 100 of FIG. 1 are represented, according to some embodiments. As shown, in the illustrated system wireless device 106 may be a mobile station (STA) 106 and wireless device 102 may be an access point 102 (also referred to as an "AP", or alternatively as a "base station" or "BS"). The STA 106 may be a user device with Wi-Fi communication capability such as a mobile phone, a handheld device, a wearable device, a computer or a tablet, fixed wireless device, or virtually any type of wireless device. The AP 102 may be an access point device with Wi-Fi communication capability such as a wireless router or other wireless access point.

Either or both of the AP 102 and the STA 106 may include a processor that is configured to execute program instructions stored in memory. Either or both of the AP 102 and the STA 106 may perform any of the method embodiments described herein by executing such stored instructions. Alternatively, or in addition, a programmable hardware element such as an FPGA (field-programmable gate array) that is configured to perform any of the method embodiments described herein, or any portion of any of the method embodiments described herein, may be included as part of the AP 102 and/or the STA 106.

Figure 3:
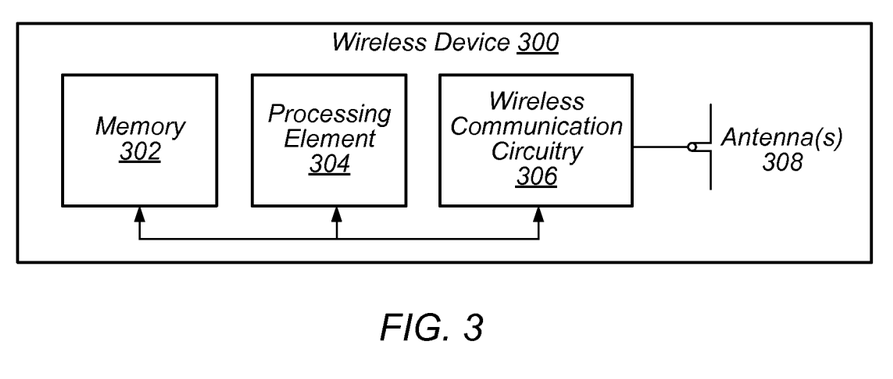
FIG. 3 illustrates a block diagram of an exemplary wireless device.

FIG. 3—Exemplary Block Diagram of a Wireless Device

FIG. 3 illustrates an exemplary block diagram of a wireless device 300 which may be configured for use in conjunction with various aspects of the present disclosure. The device 300 may be any of a variety of types of device and may be configured to perform any of a variety of types of functionality. For example, the device 300 may be a substantially portable device (a mobile device), such as a mobile phone, a personal productivity device, a computer or a tablet, a handheld gaming console, a portable media player, etc. Alternatively, the device 300 may be a substantially stationary device, such as a television, a subwoofer, speaker, or other audio rendering device, a wireless access point, a set-top box, etc.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types and functions are also possible.

The device 300 may also include wireless communication circuitry 306. The wireless communication circuitry 306 may include analog and/or digital circuitry components, and include one or more radios. In general, a radio may include any combination of a baseband processor, analog RF signal processing circuitry (e.g., including filters, mixers, oscillators, amplifiers, etc.), or digital processing circuitry (e.g., for digital modulation as well as other digital processing). The radio may implement one or more receive and transmit chains using the aforementioned hardware. In some instances, the wireless device 300 may share one or more parts of a receive and/or transmit chain between multiple wireless communication technologies, such as those discussed above. The wireless communication circuitry may include or be coupled to one or more antennas 308.

Note that if desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may providing processing capability for the wireless communication circuitry 306. The device 300 may be capable of communicating using any of various wireless communication technologies by way of wireless communication circuitry 306 and antenna(s) 308.

The device 300 may additionally include any of a variety of other components (not shown) for implementing device functionality, depending on the intended functionality of the device 300, which may include further processing and/or memory elements, one or more power supply elements (which may rely on battery power and/or an external power source) user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, wireless communication circuitry 306, and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing features for estimating load and throughput of a wireless network, such as those described herein with reference to, inter alia, FIG. 4.

FIG. 4—Flowchart Diagram

FIG. 4 is a flowchart diagram illustrating an example method that may be used for performing wireless communication in a wireless communication system, such as an IEEE 802.11 wireless communication system. As one particular possibility, the method may be used to estimate the load and throughput of a network prior to (or after) associating with the wireless network. For example, the method of FIG. 4 may be used in order to determine which of multiple available wireless networks would provide the highest throughput to a wireless device given the current network load and utilization.

The method shown in FIG. 4 may be used in conjunction with any of the computer systems or devices shown in the above Figures, among other devices. Some of the method elements shown may be performed concurrently, in a different order than shown, may be substituted for by other method elements, or may be omitted. Additional method elements may also be performed as desired. As shown, the methods may operate as follows.

A wireless device may determine the number of active uplink and/or active downlink nodes in a wireless network (402). Such a determination may be made autonomously by the wireless device or based on an indication received from another wireless device.

For example, an access point that provides the wireless network might measure the number of active downlink nodes and the number of active uplink nodes in the network (e.g., over a certain period of time, such as the most recent period of time), and provide an indication of this measure to wireless devices within communicative range by way of a broadcast communication. In such a case, the wireless device might receive this indication and determine the number of active uplink and/or active downlink nodes in the wireless network based on this indication rather than autonomously making such a determination. As a specific example, an access point might broadcast such information in a load information element, which might be included in periodic beacon frame transmissions or load information frame transmissions.

Alternatively (or in addition, e.g., for a different wireless network), the wireless device may autonomously determine the number of active uplink and/or active downlink nodes in a wireless network by monitoring the wireless medium (or media) on which communication is performed in the wireless network. This may include monitoring transmissions on the medium (e.g., physical carrier sensing) to determine the number of discrete nodes to and/or from which communications are performed over a period of time, inferring from scheduling information (e.g., virtual carrier sensing) the number of discrete nodes to and/or from which communications are performed over a period of time, or some combination thereof. For example, as one possibility, a wireless device may count a number of nodes scheduled in one or more traffic indication maps (TIMs) provided by an access point providing the wireless network over a period of time to infer the number of active downlink nodes in the wireless network over that period of time. As another example, a wireless device may count the number of distinct destination MAC addresses of ACK packets transmitted by the access point providing the wireless network over a period of time to determine the number of active uplink nodes in the wireless network over that period of time.

Note that as a still further possibility, a more approximate estimation of either or both of the number of active uplink and downlink nodes may be used if desired. For example, a wireless device may infer the number of active downlink nodes as described above, and estimate the number of active uplink nodes based on that determination (e.g., approximately equal, approximately half, etc.). This may be desirable, as one possibility, in order to avoid excessive power consumption by a wireless device, which might be required to continuously monitor the wireless medium for a period of time.

The wireless device may determine channel utilization of the wireless network (404). Such a determination may be made autonomously by the wireless device or based on an indication received from another wireless device.

For example, an access point that provides the wireless network might monitor the wireless network to measure its channel utilization (e.g., over a certain most recent period of time), and provide an indication of this to wireless devices within communicative range by way of a broadcast communication. In such a case, the wireless device might receive this indication and determine the channel utilization of the wireless network based on this indication rather than autonomously making such a determination. As a specific example, an access point might broadcast such information in a load information element (e.g., which might also include information indicating a number of active uplink nodes and a number of active downlink nodes in the wireless network), which might be included in periodic beacon frame transmissions or load information frame transmissions. Note that while in some instances both channel utilization information and the numbers of active uplink and downlink nodes may be provided by an access point in beacon transmissions, it is also possible that an access point may provide only one or the other type of information, while the wireless device may autonomously determine the other type of information.

The wireless device may alternatively (or additionally, e.g., for a different wireless network) autonomously determine the channel utilization of a wireless network by monitoring the wireless medium (or media) on which communication is performed in the wireless network. This may include monitoring transmissions on the medium (e.g., physical carrier sensing) and/or inferring from network allocation vectors (e.g., virtual carrier sensing) to determine what proportion of time the medium is busy (utilized) over a period of time.

The wireless device may also estimate an uplink data rate and/or a downlink data rate that the wireless device would achieve if associated with the wireless network. For example, the wireless device may measure the signal strength (e.g., received signal strength indicator (RSSI) and/or other metrics) of the access point providing the wireless network. This RSSI may be mapped to a signal to noise ratio (SNR), which may in turn be mapped to an expected PHY data rate (or separate expected uplink and downlink PHY data rates), which the wireless device may expect to obtain as part of that wireless network. For example, a wireless device that is relatively close to an access point and experiences a high RSSI and SNR may be able to use a higher PHY data rate when communicating with the access point than a wireless device that is further away from the access point and experiences a lower RSSI and SNR.

The wireless device may estimate the uplink throughput and/or downlink throughput of the wireless device in the wireless network (406). The uplink throughput and/or downlink throughput may be estimated based on determining the number of uplink and/or downlink nodes in the wireless network, determining the channel utilization of the wireless network, and estimating the uplink and/or downlink data rate of the wireless device in the wireless network. For example, to determine an estimated maximum possible uplink throughput that the wireless device might be able to obtain in the wireless network, the wireless device might estimate what proportion of time the wireless device would be able to use the wireless medium for uplink communication based on the current load (e.g., based on the number of active uplink nodes contesting the medium in combination with the current channel utilization of the wireless network), and multiply that proportion by the estimated uplink data rate with which the wireless device would be able to perform those uplink communications. Similarly, to determine an estimated maximum possible downlink throughput that the wireless device might be able to obtain in the wireless network, the wireless device might estimate what proportion of time would be allocated to the wireless device for downlink communication based on the current load, and multiply that proportion by the estimated downlink data rate with which the wireless device would be able to receive those downlink communications.

If desired, the wireless device may estimate either or both of uplink throughput or downlink throughput the wireless device could expect to realize in the wireless network. Furthermore, if desired, the wireless device may estimate a blended throughput, for example if the wireless device expects to perform bi-directional communication on the wireless network. The blended rate may be a weighted summation of the estimated uplink throughput and the estimated downlink throughput, with weights for each selected based on an expected traffic blend (e.g., proportions of uplink and downlink traffic expected by the wireless device) and summing to unity, as one possibility.

The wireless device may perform such throughput estimation with respect to multiple wireless networks, in some instances. For example, the wireless device may be within communicative range of multiple wireless networks, and may obtain (e.g., by receiving indications or and/or autonomously determining) the numbers of active uplink and/or downlink nodes, the channel utilization, and the estimated data rate(s) of the wireless device in each of those available wireless networks and perform throughput estimation with respect to each of those available wireless networks using that information.

At least in some instances, the wireless device may select a wireless network to join based at least in part on estimating the uplink throughput and/or the downlink throughput of the wireless device with respect to each of the wireless networks for which such estimation is performed. For example, the wireless device might select a wireless network to join based on which wireless network has the highest estimated uplink throughput, downlink throughput, or blended throughput (e.g., depending on the priority of the wireless device at the time; note that the AP providing the highest downlink throughput may be different from the AP providing the highest uplink throughput) of the available wireless networks for which throughput estimation is performed. The wireless device may then join (associate with) the selected wireless network.

Figure 5:
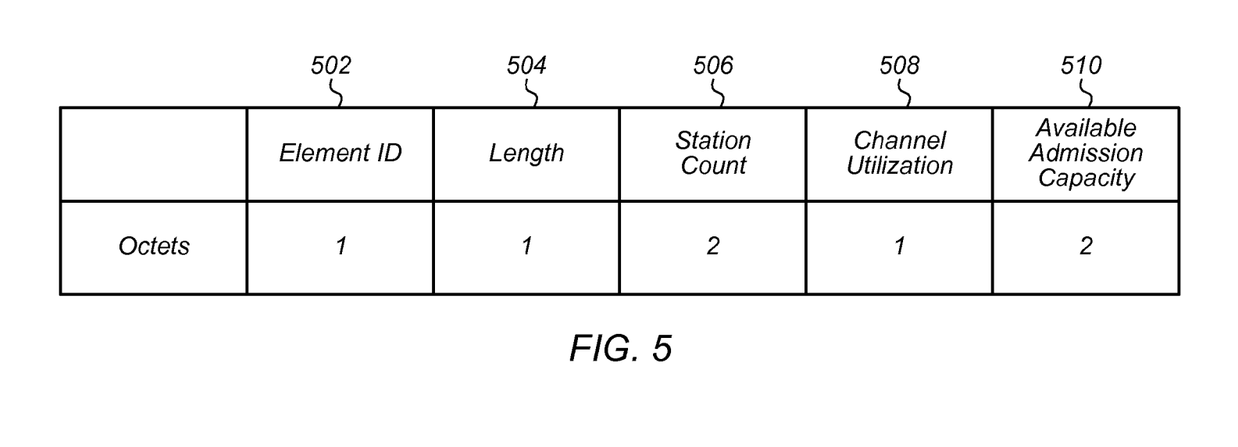
FIGS. 5-6 illustrate exemplary possible formats for providing network load information from an AP to a STA.
Figure 6:
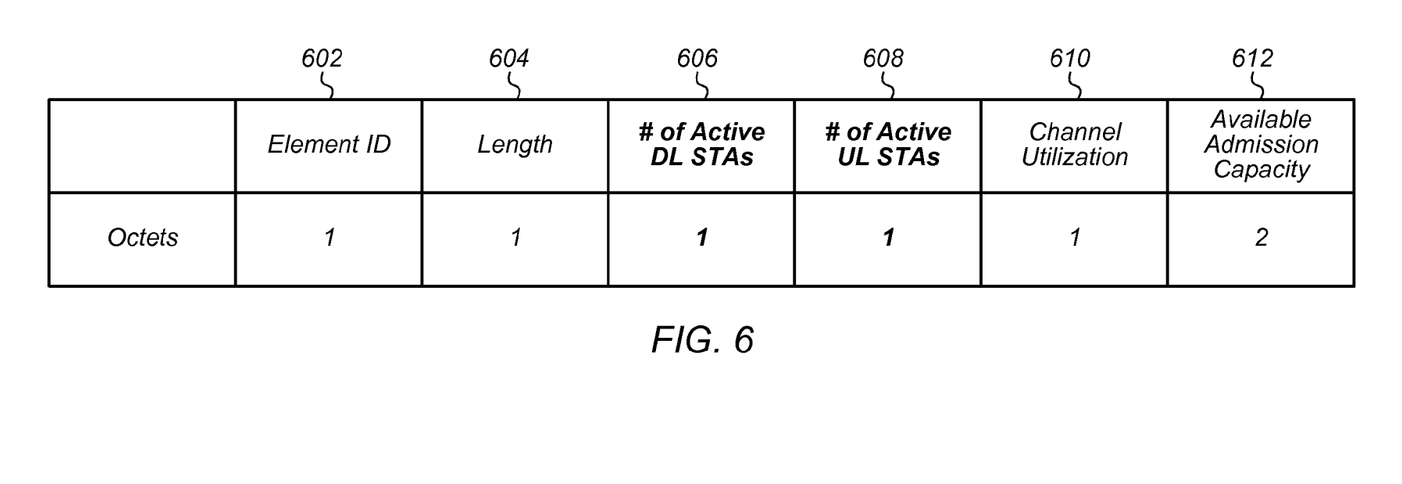

FIGS. 5-6—Exemplary Possible Load Information Format

FIGS. 5-6 and the information provided herein below in conjunction therewith are provided by way of example of various considerations and details relating to a possible IEEE 802.11 wireless communication system in which the method of FIG. 4 may be implemented, and are not intended to be limiting to the disclosure as a whole. Numerous variations and alternatives to the details provided herein below are possible and should be considered within the scope of the disclosure.

FIG. 5 illustrates an exemplary basic service set (BSS) Load information element (IE) such as defined in IEEE 802.11k. As shown, the IE may include element ID 502, length 504, station count 506, channel utilization 508, and available admission capacity 510 fields, those fields having lengths (in octets) of 1, 1, 2, 1, and 2 respectively.

The station count field 506 may be an unsigned integer indicating the total number of STAs currently associated with the BSS corresponding to the BSS Load IE. In other words, this field may indicate both active and inactive STAs, and does not differentiate between STAs engaged in uplink communications and STAs engaged in downlink communications.

The channel utilization field 508 may provide an indication of the percentage of time that the access point sensed (e.g., virtually or physically) that the medium was busy. As a one octet field, as one possibility the field may be linearly scaled with the value 255 representing 100% utilization. Note also that when more than one channel is in use for the BSS, it may be the case that the channel utilization field value is calculated only for the primary channel. According to IEEE 802.11k, the percentage may be calculated using the formula:

Channel Utilization=Integer((channel busy time/
(dot11ChannelUtilizationBeaconIntervals*
dot11BeaconPeriod*1024))*255), where:
channel busy time is defined to be the number of microseconds during which the carrier sensing (CS) mechanism has indicated a channel busy indication, and
dot11ChannelUtilizationBeaconIntervals represents the number of consecutive beacon intervals during which the channel busy time is measured.

The available admission capacity field 510 may contain an unsigned integer that specifies the remaining amount of medium time available via explicit admission control, in units of 32 microseconds per second (μs/s). The field may be helpful for roaming STAs to select an AP that is likely to accept future admission control requests, but may not represent an assurance that the hybrid coordinator (HC) admits these requests.

FIG. 6 illustrates an exemplary BSS Load IE that is modified relative to the BSS Load IE illustrated in FIG. 5. The fields of the modified BSS Load IE may be similar to those of the IEEE 802.11k BSS Load IE, for example including element ID 602, length 604, channel utilization 610, and available admission capacity 612 fields, but instead of a two octet station count field, the modified BSS Load IE may include a one octet field 606 for indicating the number of stations in the BSS that are actively engaged in downlink communication (active DL STAs) and a one octet field 608 for indicating the number of stations in the BSS which are actively engaged in uplink communication (active UL STAs). Note that the lengths of these two fields 606, 608 could be different; for example 10 bits for 606 and 6 bits for 608, or any of various other possible lengths. It may be preferable for the length of each field to be known in advance, e.g., to ensure that a receiver is able to correctly interpret the IE.

Such a modified BSS Load IE as illustrated in FIG. 6 may thus provide a mechanism for an access point to provide an indication to STAs considering joining its BSS of the number of active uplink and downlink nodes, as well as the current channel utilization, such as according to the method of FIG. 4, at least in some instances.

FIGS. 7-11—Exemplary Mechanism for a STA to Determine Number of Active Downlink Nodes in a Wireless Network FIGS. 7-11 and the information provided herein below in conjunction therewith are provided by way of example of various considerations and details relating to a possible IEEE 802.11 wireless communication system in which the method of FIG. 4 may be implemented, and are not intended to be limiting to the disclosure as a whole. Numerous variations and alternatives to the details provided herein below are possible and should be considered within the scope of the disclosure.

In particular, whereas FIGS. 5-6 illustrate possible exemplary IE format considerations for an access point to signal the number of active uplink and/or downlink nodes in a wireless network to a wireless device, FIGS. 7-11 illustrate aspects of an exemplary mechanism for a STA to determine the number of active downlink nodes in a wireless network, for example in case the access point providing the wireless network does not provide a BSS Load IE in beacon broadcasts (or provides such an IE in the 802.11k format which does not explicitly indicate the number of active DL and UL nodes).

Figure 7:
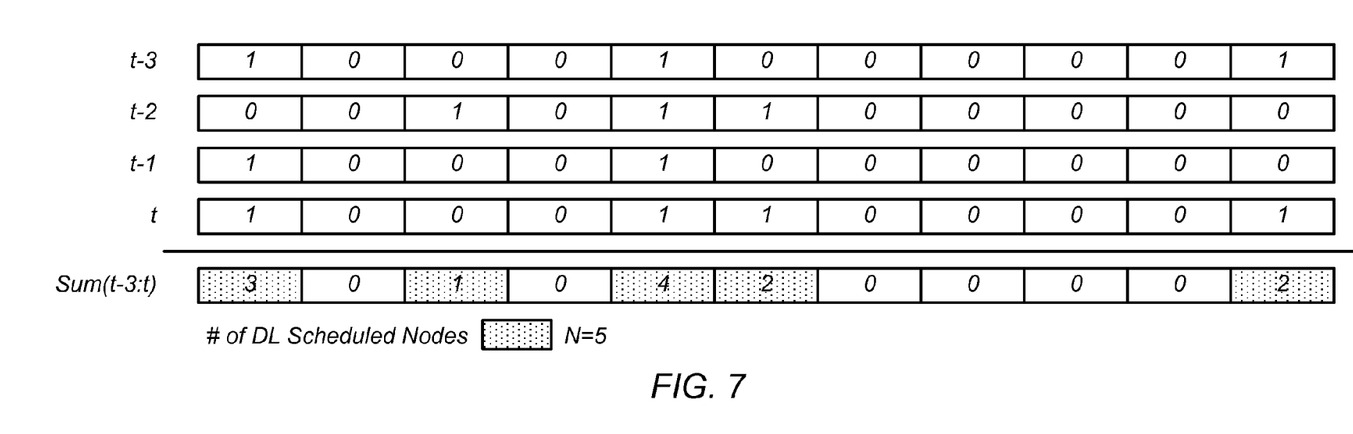
FIGS. 7-11 illustrate aspects of an exemplary mechanism for a STA to estimate the number of active downlink STAs in a wireless network.

Even if an AP does not explicitly indicate the number of active DL and UL nodes among its BSS, the AP may still provide a traffic indication map (TIM) (or delivery traffic indication map (DTIM)) in some or all of the beacons broadcast by that AP. The TIM may be used by a STA receiving it to reconstruct the traffic indication virtual bitmap for that AP's BSS for the period of time to which that TIM corresponds. Each bit in the map may correspond to a STA in the AP's BSS. Thus, by reading the traffic indication virtual bitmap of a wireless network, a STA may be able to determine the number of STAs in the wireless network that are scheduled for downlink communication for that period of time. If desired, such information may be accumulated over a period of time to infer the number of active downlink STAs in the wireless network over that period of time, as well as the frequency of scheduling of those nodes over that period of time.

An example of such accumulation of multiple traffic indication bitmaps and estimation of the number of active downlink nodes in a wireless network is illustrated in FIG. 7. In the illustrated scenario of FIG. 7, four (e.g., most recent) TIMs may be accumulated. As shown, over the course of those TIMs, five different STAs may have been scheduled for downlink communication (some of which on multiple occasions). Thus, in this exemplary scenario, the number of active downlink STAs in the wireless network over the given period of time would be five.

Figure 8:
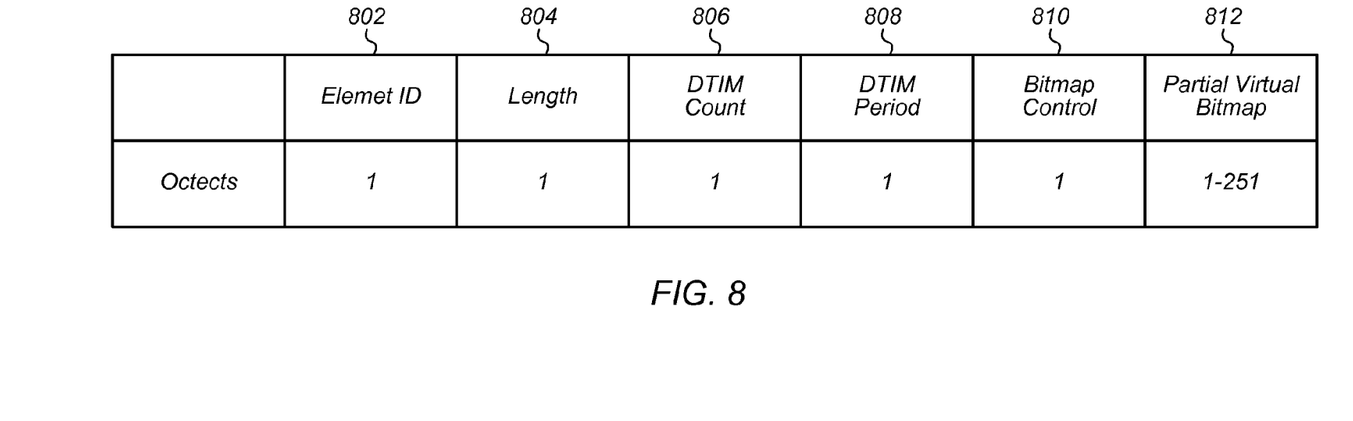

FIG. 8 illustrates an exemplary IE format for a TIM IE. As shown, in addition to an element ID field 802 and a length field 804, the IE may also include a DTIM count field 806, a DTIM period field 808, a bitmap control field 810, and a partial virtual bitmap field 812. Each field may be, e.g., one octet in length, except for the partial virtual bitmap field 812, which may be variable in length in some implementations.

The DTIM count field 806 may indicate how many beacon frames (including the current frame) may occur before the next DTIM will be transmitted. The DTIM period field 808 may indicate the number of beacon intervals between successive DTIMs. The bitmap control field 810 may include a traffic indicator bit associated with AID 0 (bit 0) and a bitmap offset portion (bits 1-7) that enables use of a partial virtual bitmap (e.g., instead of a full bitmap of all STAs in the BSS).

The AP may maintain a full traffic indication virtual bitmap, which may be used to generate the partial virtual bitmap transmitted at each DTIM interval. As one possibility, the traffic indication virtual bitmap may include 2008 bits (or 251 octets). Each bit may be set to 0 if there is no individually addressed traffic (e.g., MSDUs/MMPDUs) configured to be delivered (e.g., buffered) for the STA corresponding to that bit. If there is any individually addressed traffic configured to be delivered for the STA corresponding to a bit, that bit may be set to 1.

The partial virtual bitmap that the AP may actually transmit may include a subset of the traffic indication virtual bitmap. The partial virtual bitmap may include octets numbered 'N1' to 'N2'. N1 may be the largest even number such that the bits numbered 1 to (N1*8)−1 in the bitmap are all 0. N2 may be the smallest number such that the bits numbered (N2+1)*8 to 2007 in the bitmap are all 0. On this basis, the bitmap offset subfield value may be set to the number (N1)/2, and the length field may be set to (N2−N1)+4, to enable STAs to reconstruct the full bitmap from the partial virtual bitmap.

Figure 9:
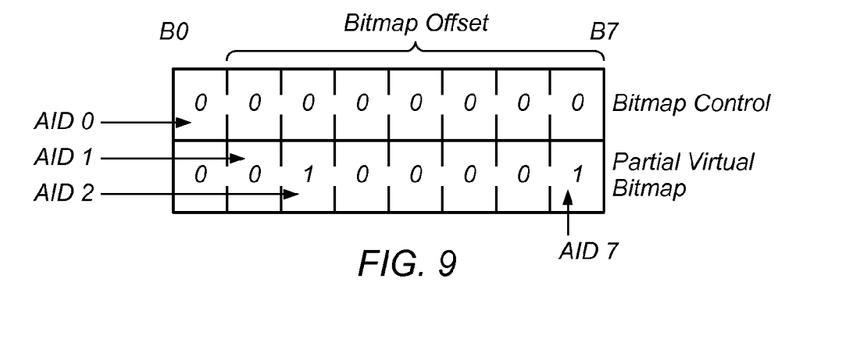
Figure 10:
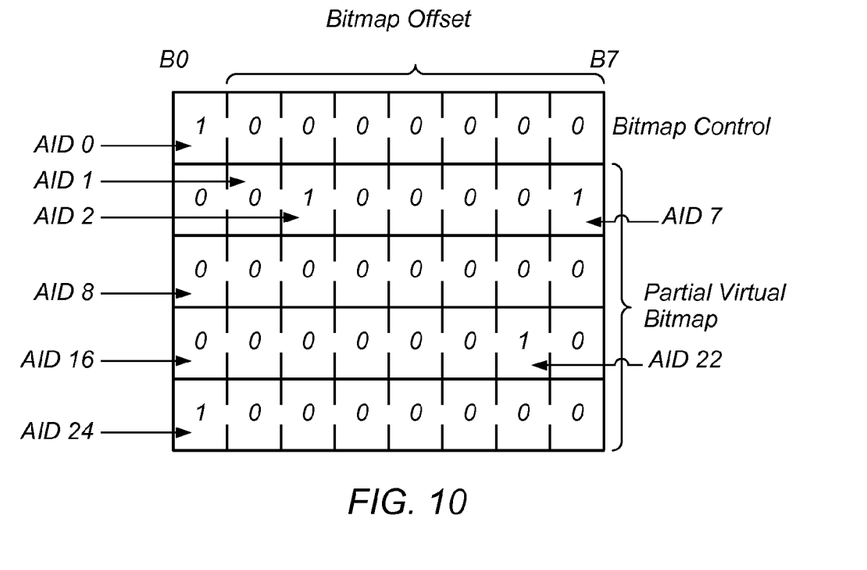
Figure 11:
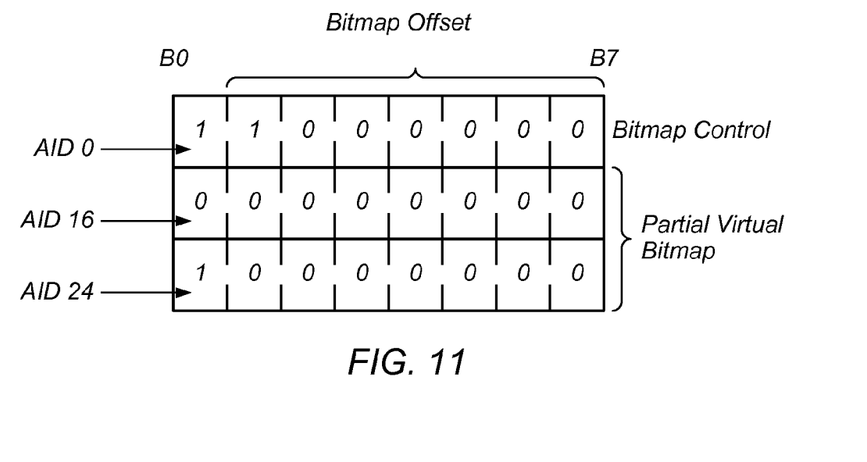

FIGS. 9-11 illustrate examples of such partial virtual bitmaps (including bitmap control fields) that could be constructed on such a basis. In the exemplary scenario of FIG. 9, there may be no group addressed packets, so B0 may be set to 0, as shown. Additionally, there may be traffic for just two STAs: AID 2 and AID 7. Accordingly, there may be no bitmap offset in this case, and the partial virtual bitmap may be truncated (e.g., if there are more than eight STAs in the BSS) after one octet.

In the exemplary scenario of FIG. 10, there is group addressed traffic, so B0 may be set to 1, as shown. In addition, there may be traffic for four STAs: AIDs 2, 7, 22, and 24. Accordingly, there may be no bitmap offset in this case, and the partial virtual bitmap may be truncated (e.g., if there are more than thirty-two STAs in the BSS) after four octets.

In the exemplary scenario of FIG. 11, there also is group addressed traffic, so B0 may be set to 1, as shown. In addition, there may be traffic for just one STA: AID 24. Accordingly, in this case there may be a bitmap offset value of 1, and the partial virtual bitmap may be truncated (e.g., if there are more than thirty-two STAs in the BSS) after two octets.

Additional Information

The following information is provided by way of example of various considerations and details relating to a possible IEEE 802.11 wireless communication system in which the method of FIG. 4 may be implemented, and are not intended to be limiting to the disclosure as a whole. Numerous variations and alternatives to the details provided herein below are possible and should be considered within the scope of the disclosure.

As previously noted, a STA that has determined the number of active uplink nodes, the number of active downlink nodes, the channel utilization, and the STA's data rate in a given network may utilize such information to estimate what throughput the STA would be able to obtain in the given network.

One such technique for estimating uplink throughput may include estimating the average fraction of time that would be allocated to a new STA in the network. On an approximate basis, carrier sensing multiple access techniques on which IEEE 802.11 may be based may provide equal access opportunity to all competing nodes. Accordingly, as one possibility, for a wireless network which is fully utilized, the average fraction of time which is allocated to a new STA may be estimated as:

$$\frac{1}{N_{UL}+1+1},$$

where $N_{UL}$, represents the number of currently active uplink nodes in the wireless network, and the incremental additions represent the competition of the AP itself and of the hypothetical new STA in the system.

Thus, on such a basis, for an estimated uplink data rate of $R_{UL}$, the expected uplink throughput $T_{est}^{UL}$ of a wireless network in the case of full channel utilization may be:

$$T_{est}^{UL} = R_{UL} * \frac{1}{N_{UL}+2}.$$

If the channel is not fully utilized (i.e., if utilization U is not equal to 1), there may be additional throughput available to a new node entering the wireless network. This may be accounted for by estimating the expected uplink throughput of a wireless network using the following more general equation:

$$T_{est}^{UL} = R_{UL} * \frac{1}{2}\left(\frac{1}{N_{UL}+2} + \max\left(\frac{1}{N_{UL}+2}, 1-U\right)\right).$$

Estimating the expected downlink throughput of a wireless network may be performed using a similar set of assumptions, if desired. As a first step of such a technique, the average fraction of time that is allocated to the AP may be determined. Similar to the estimation of the average fraction of time which would be allocated to a new STA for uplink communication, assuming approximately equal access opportunity is available to all competing nodes (and assuming the new STA will also compete for uplink communication opportunity), this may also be estimated as:

$$\frac{1}{N_{UL}+1+1}.$$

Of this fraction of time which is allocated to the AP, the fraction thereof which may be estimated to be allocated for sending downlink traffic to each active downlink STA may be:

$$\frac{1}{N_{DL}+1}.$$

Thus, the total fraction of time which may be estimated to be allocated for sending downlink traffic to each active downlink STA may be:

$$\frac{1}{N_{DL}+1}\frac{1}{N_{UL}+2},$$

and the expected downlink throughput (assuming full utilization) may be estimated as:

$$T_{ests}^{DL} = \frac{R_{DL}}{(N_{DL}+1)(N_{UL}+2)}.$$

As in the uplink case, if the channel is not fully utilized, there may be additional throughput available to a new node entering the wireless network. This may be accounted for by estimating the expected downlink throughput of a wireless network using the following more general equation:

$$T_{est}^{DL} = R_{DL} * \frac{1}{2}\left(\frac{1}{(N_{DL}+1)(N_{UL}+2)} + \max\left(\frac{1}{(N_{DL}+1)(N_{UL}+2)}, 1-U\right)\right).$$

Note that if desired, these equations may be modified by a given STA as appropriate; for example, if the given STA is not expecting to engage in uplink communication, the terms $N_{UL}+2$ may be modified to $N_{UL}+1$ when calculating expected downlink throughput for each available wireless network (e.g., to more accurately estimate the conditions likely to be experienced by that station upon joining a wireless network). Alternatively, such equations (e.g., including implicit assumptions of full buffer uplink and downlink traffic for a new node) may be used regardless of the particular buffer status of a particular STA at any given time, for example in order to simplify implementation. It should further be noted that while the above described equations may be used as one possible way of estimating uplink and downlink throughput of a given wireless network based on the numbers of active uplink and downlink nodes, the channel utilization, and the estimated data rate of a STA in the given wireless network, any of various other equations, which may utilize any of various possible alternative assumptions, may be used as desired.

As previously noted, if a STA has bi-directional traffic (uplink and downlink, which may have equal opportunity to access the medium), an estimated mixed throughput may be calculated, if desired. As one such possibility, the estimated mixed throughput T may be calculated as:

$$T = w_1 * T^{UL} + w_2 * T_{DL},$$

wherein $w_1$ and $w_2$ are weighting parameters selected such that $w_1 + w_2 = 1$.

In the following further exemplary embodiments are provided.

One set of embodiments may include a method, including: by a wireless device: determining a number of active downlink nodes and a number of active uplink nodes in a wireless network; determining channel utilization of the wireless network; estimating an uplink data rate and a downlink data rate for the wireless device in the wireless network; and estimating an uplink throughput and a downlink throughput of the wireless device in the wireless network.

According to some embodiments, the method can further include performing the determining a number of active downlink nodes and a number of active uplink nodes, determining channel utilization, determining an uplink data rate and a downlink data rate for the wireless device, and estimating an uplink throughput and a downlink throughput of the wireless device with respect to each of multiple available wireless networks.

According to some embodiments, the method can further include selecting a wireless network to join using the estimated the uplink throughput and the downlink throughput of the wireless device with respect to each of the multiple available wireless networks.

According to some embodiments, the method can further include selecting to join a wireless network in which the estimated uplink throughput and/or downlink throughput of the wireless device is highest among the available wireless networks.

According to some embodiments, determining a number of active downlink nodes and a number of active uplink nodes, determining channel utilization, determining an uplink data rate and a downlink data rate for the wireless, and estimating an uplink throughput and a downlink throughput of the wireless device in the wireless network are performed while the wireless device is not associated with the wireless network.

According to some embodiments, determining the number of active downlink nodes and the number of active uplink nodes in the wireless network includes receiving an indication of the number of active downlink nodes and the number of active uplink nodes in the wireless network from an access point providing the wireless network.

According to some embodiments, determining the number of active downlink nodes in the wireless network includes counting a number of nodes scheduled in one or more traffic indication maps (TIMs) provided by an access point providing the wireless network over a period of time.

According to some embodiments, determining the number of active uplink nodes in the wireless network includes counting a number of distinct destination MAC addresses of ACK packets transmitted by an access point providing the wireless network over a period of time.

According to some embodiments, determining the channel utilization of the wireless network includes receiving an indication of the channel utilization of the wireless network from an access point providing the wireless network.

According to some embodiments, determining the channel utilization of the wireless network includes monitoring a primary channel of the wireless network for busyness for a period of time.

A further set of embodiments may include a wireless device, including a radio; and a processing element; wherein the radio and the processing element are configured to: determine that multiple wireless networks are available within communicative range of the wireless device; determine one or more of a number of active downlink nodes or a number of active uplink nodes in each of the wireless networks; determine channel utilization of each of the wireless networks; estimate one or more of an uplink data rate or a downlink data rate for the wireless device in each of the wireless networks; and estimate one or more of an uplink throughput or a downlink throughput of each of the wireless networks.

According to some embodiments, the radio and the processing element are further configured to: measure a received signal strength indicator (RSSI) value of each of the wireless networks, wherein estimating one or more of the uplink data rate or the downlink data rate for the wireless device in each of the wireless networks is based at least in part on the measured RSSI value of each of the wireless networks.

According to some embodiments, the radio and the processing element are further configured to: receive beacon broadcasts from each of the wireless networks, wherein each beacon broadcast from a respective wireless network of the wireless networks includes information indicating a number of active downlink nodes, a number of active uplink nodes, and a channel utilization for the respective wireless network.

According to some embodiments, the radio and the processing element are further configured to: estimate a blended uplink and downlink throughput of each respective network of the wireless networks using a weighted summation of the estimated uplink throughput and the estimated downlink throughput for each respective network.

According to some embodiments, the radio and the processing element are further configured to: estimate the uplink throughput of each respective wireless network of the plurality of the wireless networks using the determined number of active uplink nodes in the respective wireless network, the channel utilization of the respective wireless network, and the estimated uplink data rate for the wireless device in the respective wireless network; and estimate the downlink throughput of each respective wireless network using the determined number of active uplink nodes in the respective wireless network, the determined number of active downlink nodes in the respective wireless network, the channel utilization of the respective wireless network, and the estimated downlink data rate for the wireless device in the respective wireless network.

According to some embodiments, the radio and the processing element are further configured to: select a wireless network to join using the estimated uplink throughput and/or downlink throughput of each of the wireless networks; and associate with the selected wireless network.

Yet another set of embodiments may include a method, including: by a wireless access point device: providing a wireless network on a wireless channel; determining a number of active downlink nodes in the wireless network; determining a number of active uplink nodes in the wireless network; and periodically broadcasting an indication of the determined number of active downlink nodes and the determined number of active uplink nodes in the wireless network.

According to some embodiments, the method further includes: determining channel utilization of the wireless channel of the wireless network; and periodically broadcasting an indication of the determined channel utilization.

According to some embodiments, the wireless access point device operates according to IEEE 802.11, wherein the wireless network is an IEEE 802.11 network.

According to some embodiments, the method further includes: periodically updating the determined number of active downlink nodes and the determined number of active uplink nodes in the wireless network.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method, comprising:
by a wireless device, prior to associating with a wireless network:
determining a number of active downlink nodes and a number of active uplink nodes in the wireless network;
determining channel utilization of the wireless network;
estimating an uplink data rate and a downlink data rate for the wireless device in the wireless network; and
estimating an uplink throughput and a downlink throughput of the wireless device in the wireless network, wherein said estimating the uplink throughput of the wireless network comprises using the determined number of active uplink nodes in the respective wireless network, the channel utilization of the respective wireless network, and the estimated uplink data rate for the wireless device in the respective wireless network, and wherein said estimating the downlink throughput of the wireless network comprises using the determined number of active downlink nodes in the respective wireless network, the channel utilization of the respective wireless network, and the estimated downlink data rate for the wireless device in the respective wireless network.

2. The method of claim 1, further comprising:
performing said determining a number of active downlink nodes and a number of active uplink nodes, determining channel utilization, determining an uplink data rate and a downlink data rate for the wireless device, and estimating an uplink throughput and a downlink throughput of the wireless device with respect to each of a plurality of available wireless networks.

3. The method of claim 2, further comprising:
selecting a first wireless network of the plurality of available wireless networks to join using the estimated uplink throughput and downlink throughput of the wireless device with respect to each of the plurality of available wireless networks.

4. The method of claim 3, further comprising:
selecting to join the first wireless network in which the estimated uplink throughput and/or downlink throughput of the wireless device is highest among the plurality of available wireless networks.

5. The method of claim 1, further comprising:
estimating a blended uplink and downlink throughput of the wireless device in the wireless network,
wherein the blended uplink and downlink throughput of the wireless device in the wireless network is estimated by weighting and summing the estimated uplink throughput and the estimated downlink throughput of the wireless device in the wireless network based on an expected traffic blend of the wireless device.

6. The method of claim 1, wherein determining the number of active downlink nodes and the number of active uplink nodes in the wireless network comprises:
receiving an indication of the number of active downlink nodes and the number of active uplink nodes in the wireless network from an access point providing the wireless network.

7. The method of claim 1, wherein determining the number of active downlink nodes in the wireless network comprises:
counting, over a period of time, a number of nodes scheduled in one or more traffic indication maps (TIMs) provided by an access point providing the wireless network.

8. The method of claim 1, wherein determining the number of active uplink nodes in the wireless network comprises:
counting, over a period of time, a number of distinct destination MAC addresses of ACK packets transmitted by an access point providing the wireless network.

9. The method of claim 1, wherein determining the channel utilization of the wireless network comprises:
receiving an indication of the channel utilization of the wireless network from an access point providing the wireless network.

10. The method of claim 1, wherein determining the channel utilization of the wireless network comprises:
monitoring, over a period of time, a primary channel of the wireless network for utilization.

11. A wireless device, comprising:
a radio; and
a processing element;
wherein the radio and the processing element are configured to:
determine that a plurality of wireless networks are available within communicative range of the wireless device;
determine a number of active downlink nodes and/or a number of active uplink nodes in each of the plurality of wireless networks;
determine a channel utilization of each of the plurality of wireless networks;
estimate an uplink data rate and a downlink data rate for the wireless device in each of the plurality of wireless networks;
estimate an uplink throughput and a downlink throughput of each of the plurality of the wireless networks, wherein said estimating the uplink throughput of each respective wireless network of the plurality of the wireless networks comprises using the determined number of active uplink nodes in the respective wireless network, the channel utilization of the respective wireless network, and the estimated uplink data rate for the wireless device in the respective wireless network, and wherein said estimating the downlink throughput of each respective wireless network of the plurality of the wireless networks comprises using the determined number of active downlink nodes in the respective wireless network, the channel utilization of the respective wireless network, and the estimated downlink data rate for the wireless device in the respective wireless network; and
select a wireless network to join of the plurality of wireless networks using the estimated uplink throughput and/or downlink throughput of each of the plurality of the wireless networks.

12. The wireless device of claim 11, wherein the radio and the processing element are further configured to:
measure a received signal strength indicator (RSSI) value of each of the plurality of wireless networks; and
measure a signal to noise ratio (SNR) value of each of the plurality of wireless networks,
wherein estimating one or more of the uplink data rate or the downlink data rate for the wireless device in each of the plurality of wireless networks uses the measured RSSI and/or SNR value of each of the plurality of wireless networks.

13. The wireless device of claim 11, wherein the radio and the processing element are further configured to:
receive beacon broadcasts from each of the plurality of wireless networks,
wherein each beacon broadcast from a respective wireless network of the plurality of wireless networks comprises information indicating a number of active downlink nodes, a number of active uplink nodes, and a channel utilization for the respective wireless network.

14. The wireless device of claim 11, wherein the radio and the processing element are further configured to:
estimate a blended uplink and downlink throughput of each respective network of the plurality of the wireless networks using a weighted summation of the estimated uplink throughput and the estimated downlink throughput for each respective network.

15. The wireless device of claim 11, wherein the radio and the processing element are further configured to:
attempt to associate with the selected wireless network.

16. The wireless device of claim 11, wherein said estimating the downlink throughput of each respective wireless network of the plurality of the wireless networks comprises using the determined number of active uplink nodes in the respective wireless network.

17. An apparatus, comprising:
one or more processing elements, wherein the one or more processing elements are configured to:
determine that a plurality of wireless networks are available within communicative range of the wireless device;
determine a number of active downlink nodes and a number of active uplink nodes in each of the plurality of wireless networks;
determine a channel utilization of each of the plurality of wireless networks;
estimate an uplink data rate and/or a downlink data rate for the wireless device in each of the plurality of wireless networks;
estimate an uplink throughput and a downlink throughput of each of the plurality of the wireless networks, wherein estimating the uplink throughput of each respective wireless network of the plurality of the wireless networks uses the determined number of active uplink nodes in the respective wireless network, the channel utilization of the respective wireless network, and the estimated uplink data rate for the wireless device in the respective wireless network, and wherein estimating the downlink throughput of each respective wireless network of the plurality of the wireless networks uses the determined number of active uplink nodes in the respective wireless network, the determined number of active downlink nodes in the respective wireless network, the channel utilization of the respective wireless network, and the estimated downlink data rate for the wireless device in the respective wireless network; and select a wireless network to join of the plurality of wireless networks using the estimated uplink throughput and downlink throughput of each of the plurality of the wireless networks.

18. The apparatus of claim 17, wherein the one or more processing elements are further configured to:

measure a received signal strength indicator (RSSI) value of each of the plurality of wireless networks; and measure a signal to noise ratio (SNR) value of each of the plurality of wireless networks, wherein estimating one or more of the uplink data rate or the downlink data rate for the wireless device in each of the plurality of wireless networks uses the measured RSSI and/or SNR value of each of the plurality of wireless networks.

19. The apparatus of claim 17, wherein the one or more processing elements are further configured to:

receive beacon broadcasts from each of the plurality of wireless networks, wherein each beacon broadcast from a respective wireless network of the plurality of wireless networks comprises information indicating a number of active downlink nodes, a number of active uplink nodes, and a channel utilization for the respective wireless network.

20. The apparatus of claim 17, wherein the one or more processing elements are further configured to:

attempt to associate with the selected wireless network.

* * * * *